W. A. HASSELL, Jr.
RUNNING GEAR FOR AUTOMOBILES.
APPLICATION FILED NOV. 8, 1915.

1,209,290.

Patented Dec. 19, 1916.
2 SHEETS—SHEET 2.

Witness
J. Gordon Parker

Inventor
W. A. Hassell Jr.
By Robt. D. Johnston
Attorney

UNITED STATES PATENT OFFICE.

WILLIAM A. HASSELL, JR., OF KELLERMAN, ALABAMA, ASSIGNOR OF FORTY-NINE ONE-HUNDREDTHS TO H. L. FRANKLIN, OF KELLERMAN, ALABAMA.

RUNNING-GEAR FOR AUTOMOBILES.

1,209,290.  Specification of Letters Patent.  Patented Dec. 19, 1916.

Application filed November 8, 1915. Serial No. 60,238.

*To all whom it may concern:*

Be it known that I, WILLIAM A. HASSELL, Jr., a citizen of the United States of America, residing at Kellerman, in the county of Tuscaloosa and State of Alabama, have invented certain new and useful Improvements in Running-Gears for Automobiles, of which the following is a specification.

My invention relates to an improvement in driving gears for automobiles and my object is to adapt the motor to directly drive both the front and rear wheels so that all wheels are available for traction purposes.

One feature of my invention relates to the simple and effective means for taking the power from the motor shaft and transferring it under independent clutch control to both front and rear axles, thereby permitting either or both of these axles to be coupled to the motor as driving conditions may require.

Another feature of my invention relates to the construction of the front axle having therein a suitable differential gear for transmitting the drive from the motor to a driving shaft for the front wheels, said shaft having near each end a universal joint disposed in line with the vertical axis of each steering knuckle and adapted to rotate the wheels which are preferably journaled in the steering knuckles.

A further feature of my invention relates to the provision of a front axle inclosing the front driving shaft and its differential gear and formed of pressed steel or as a casting to the outer ends of which I pivotally connect the steering knuckles, and the pivoted ends of both axle and knuckles are formed as yokes so as to provide space in line with their vertical axes to receive the universal joints in the front driving shaft. This driving shaft is also provided with expansion joints on each side of its differential gear drive so as to make provision for any play at the universal joints.

My invention also comprises various other novel features of construction and arrangement of parts which are hereinafter more particularly described and pointed out in the appended claim, reference being had in describing the preferred embodiment of my invention to the accompanying drawings, in which:—

Figure 1:
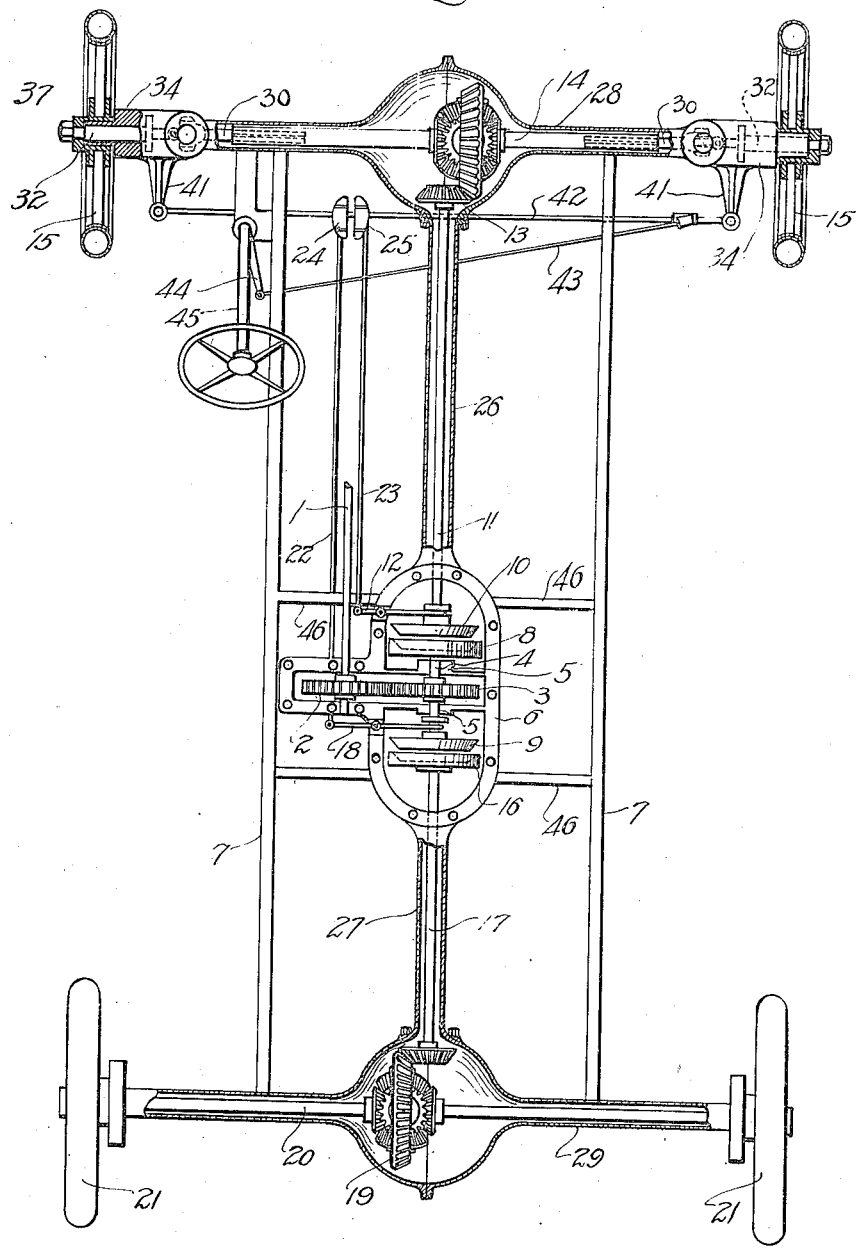
Figure 2:
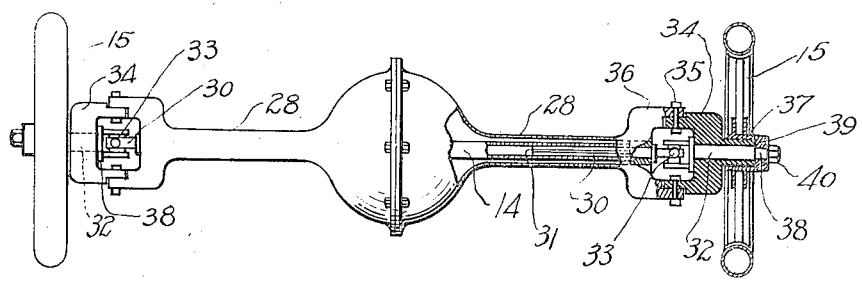
Figure 3:
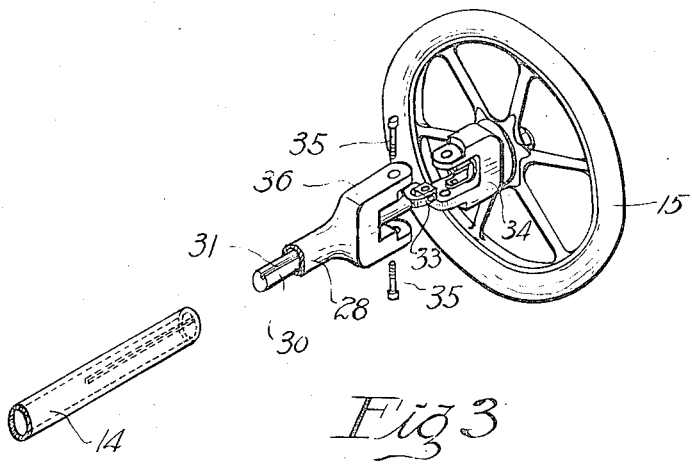

Figure 1 is a plan view of the driving gearing in accordance with my invention, the inclosing casings for the driving shafts being shown partly broken away. Fig. 2 is an elevation of the front axle with one of its steering knuckles and wheels shown in vertical cross section and with the axle broken away to illustrate in elevation the expansion joints in the drive shaft. Fig. 3 is a detail perspective view showing a steering knuckle and the expansion joint in the front driving shaft.

Similar reference numerals refer to similar parts throughout the drawings.

In describing the preferred embodiment of my invention illustrated in the drawings, 1 designates the main driving shaft or motor shaft which extends rearwardly from the power plant of the car and is mounted in any suitable bearings (not shown). At its rear end I mount fast on the shaft a gear 2 which meshes with a gear 3 on a short countershaft 4. This shaft is mounted in bearings 5 in an inclosing casing 6, which casing is formed in half sections on horizontal planes, which sections are bolted together and rigidly attached in any suitable manner to the side I-beams 7 of the frame. Mounted on the ends of the countershaft 4 are cone clutch members 8 and 9 and a co-acting clutch member 10 is slidably mounted on the forward transmission shaft 11 and under control of a clutch lever 12 adapted to engage the clutch member 8 and transmit driving motion through a differential gearing 13 to the drive shaft 14 for the front wheels 15. A clutch member 16, fast on the rear transmission shaft 17, is adapted to be engaged by the clutch member 9 which is movable on the countershaft 4 by a clutch lever 18, and when the clutch is engaged the drive is transmitted through shaft 17 and differential gearing 19 to the driving shaft 20 for the rear wheels 21. The levers 12 and 18 project through side slots in the casing 6 and are controlled by means of rods 22 and 23, respectively, leading to pedals 24 and 25 convenient to the driver. Preferably the casing 6 is formed integral with the inclosing casings 26, for the front transmission shaft 11, and 27 for the rear transmission shaft 17. The tubular axle 28 for the front drive shaft 14 includes a gear case for the forward differential gearing 13 and is rigidly connected to casing 26. In like manner the rear axle 29 for the rear drive shaft 17 is connected to the casing 27. By forming all these inclosing casings 6, 26 and 27 as an integral part and rigidly connecting them to the front and rear axles, the strength of the frame is materially increased.

The forward driving shaft 14 is made in sections, there being on each side of the differential gearing three sections comprising the tubular end of the shaft 14, a short shaft extension 30, which telescopes into the open end of the shaft end 14 and keyed thereto by an axially disposed key 31 to provide an expansion joint which will permit a limited axial play, and an outer stub shaft 32, which is connected to the shaft section 30 by means of a universal joint 33. This joint is disposed in alinement with the vertical axis about which the steering knuckle 34 will swing about the bearing pins 35 which connect it to the outer yoke shaped end 36 of the axle 28. This steering knuckle is likewise yoke shaped or U-shaped in side elevation and its ends are adapted to lap between the oppositely facing ends of the yoke 36. Each knuckle has a wheel bearing 37 and the yoke and bearing are bored to form a bearing in which the stub shaft 32 turns freely, said shaft having a shoulder 38 that bears against the inner face of the knuckle and having its outer end, which projects beyond the bearing 37, reduced and squared at 38 and this squared end passed through a squared hole in the outer end 39 of the wheel hub so as to afford a driving connection from each stub shaft to its respective forward wheel 15. The end 38 of the stub shaft is turned and threaded to receive the nuts 40 which hold the wheel in running position thereon. The shoulders 38, bearing against the knuckles, will take the outward thrust strain of the wheels from the expansion joints in the shaft. By this arrangement the stub shaft will swing freely with the steering knuckle while it is rotatably driven through the universal joint 33 and the expansion joints between the driving shaft sections will prevent any straining of parts should either universal joint shift out of true alinement with the axis of its steering knuckle. The steering knuckles are provided with crank arms 41 which are cross connected by a rod 42 that, in turn, is connected by rod 43 to the crank 44 on the steering post 45. Obviously, any other well known type of steering mechanism may be employed to swing the knuckles and steer the car. To better brace the longitudinal gear and shaft casings I provide two cross beams 46 connected at their ends to the side beams 7 of the frame and adapted to engage under and support the casings at each end of the clutch casing 6.

In operation, by use of the pedals 24 and 25 the front wheels or the rear wheels or all wheels may be directly driven from the motor. The arrangement of the universal joints in line with the knuckle axes leaves the latter free to be moved at will in steering without interfering with the transmission of the drive to the front wheels.

Obviously, many changes in the details of construction may be made without departing in principle from the essential features of my invention.

Having thus described my invention, what I claim as new and desire to secure by Letters Patent, is:—

In a running gear for automobiles, a main power shaft, a countershaft geared to the main power shaft, clutches at each end of the countershaft, a forward and a rear power transmitting shaft adapted to be connected by said clutches to the countershaft, a rear driving axle and gearing to drive it from the rear transmission shaft, a forward sectional driving shaft, gearing to drive it from the forward transmission shaft, expansion joints between said sections of said forward driving shaft, a universal joint connecting the outer end sections of said forward driving shaft to the portions thereof having the expansion joints, steering knuckles which support the forward wheels and which are U-shaped to receive said universal joints, and a bearing support in the frame for the forward driving axle and said steering knuckles, substantially as described.

In testimony whereof I affix my signature.

WILLIAM A. HASSELL, Jr.

Witness:
    NOMIE WELSH.